(12) United States Patent
Kaneko et al.

(10) Patent No.: US 7,478,622 B2
(45) Date of Patent: Jan. 20, 2009

(54) DEVICE AND METHOD FOR DETERMINING KNOCKING OF INTERNAL COMBUSTION ENGINE

(75) Inventors: Rihito Kaneko, Nishikamo-gun (JP);
Kenji Kasashima, Nishikamo-gun (JP);
Masatomo Yoshihara, Toyota (JP);
Kenji Senda, Okazaki (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/767,955

(22) Filed: Jun. 25, 2007

(65) Prior Publication Data
US 2008/0000449 A1 Jan. 3, 2008

(30) Foreign Application Priority Data
Jun. 28, 2006 (JP) .............................. 2006-178196

(51) Int. Cl.
*F02P 5/00* (2006.01)
(52) U.S. Cl. .................... 123/406.29; 123/406.37; 123/406.34; 123/406.38
(58) Field of Classification Search ........... 123/406.29, 123/406.37, 406.38, 406.39, 406.24, 406.16, 123/406.34, 406.35, 406.32, 406.5; 701/111
See application file for complete search history.

(56) References Cited

U.S. PATENT DOCUMENTS

| | | | | | |
|---|---|---|---|---|---|
| 4,969,440 | A | * | 11/1990 | Murakami et al. | 123/406.37 |
| 5,215,058 | A | * | 6/1993 | Sakakibara et al. | 123/406.38 |
| 5,467,638 | A | * | 11/1995 | Philipp | 73/35.06 |

FOREIGN PATENT DOCUMENTS

| | | |
|---|---|---|
| JP | 62-62225 | 3/1987 |
| JP | 4-76249 | 3/1992 |
| JP | 2002-47994 | 2/2002 |
| JP | 2003-21032 | 1/2003 |
| JP | 2004-353531 | 12/2004 |
| JP | 2005-23902 | 1/2005 |

* cited by examiner

*Primary Examiner*—Quang D. Thanh
*Assistant Examiner*—Hung Q Nguyen
(74) *Attorney, Agent, or Firm*—Oblon, Spivak, McClelland, Maier & Neustadt, P.C.

(57) ABSTRACT

An engine ECU executes a program including the steps of: calculating a magnitude value LOG(V) by logarithmically converting a magnitude V of vibration occurring in an engine, calculating a median V(50) and a standard deviation σ of magnitude values LOG(V); and setting, to the product of the standard deviation σ and a factor A, a first upper limit of a determination value V(KX) that is to be compared with a knock magnitude N for determining whether or not knocking has occurred, and setting a first lower limit of the determination value V(KX) to the product of the standard deviation σ and a factor B.

12 Claims, 11 Drawing Sheets

FIG. 7

|  |  |  |
|---|---|---|
| A | C | B |
| B | C | B |
| A | B | A |

INTAKE AIR AMOUNT KL

KL(2)
KL(1)

NE(1)  NE(2)
ENGINE SPEED NE

F I G. 8
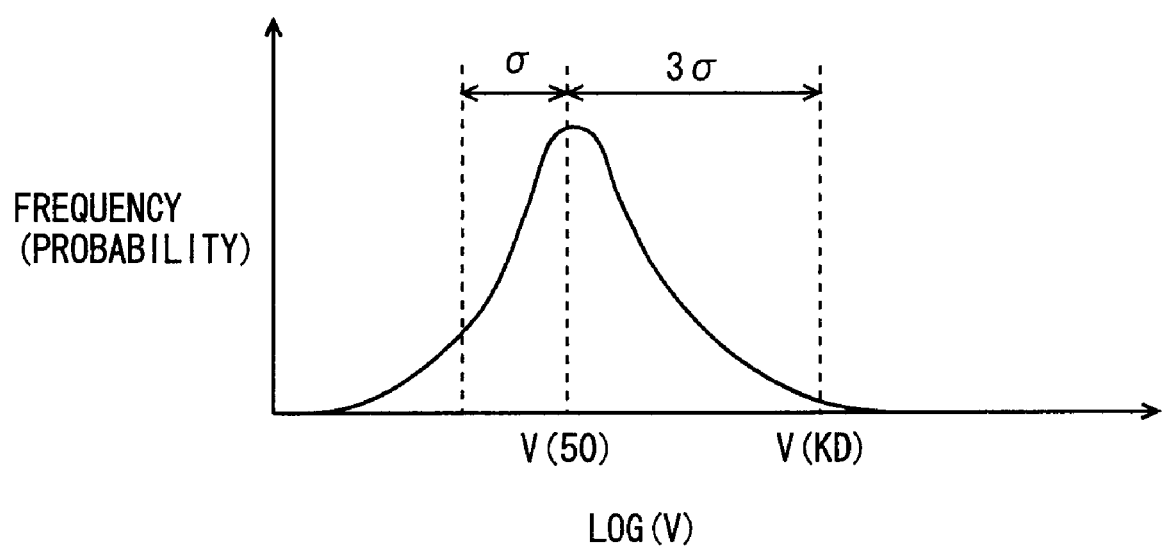

DEVICE AND METHOD FOR DETERMINING KNOCKING OF INTERNAL COMBUSTION ENGINE

This nonprovisional application is based on Japanese Patent Application No. 2006-178 filed with the Japan Patent Office on Jun. 28, 2006, the entire contents of which are hereby incorporated by reference.

BACKGROUND OF THE INVENTION

1. Field of the Invention

The present invention relates to a device and a method for determining knocking of an internal combustion engine. In particular, the invention relates to a technique of determining whether knocking has occurred or not using a value that is corrected according to the magnitude of vibration of the internal combustion engine.

2. Description of the Background Art

Various methods for detecting knocking (knock) occurring in an internal combustion engine have been proposed. For example, a technique determines that knocking has occurred when the magnitude of vibration of the internal combustion engine is larger than a threshold value. There is a case, however, where the magnitude of such noise as vibration which occurs when an intake valve or an exhaust valve for example closes is larger than the threshold value while knocking does not occur. In this case, although knocking has not occurred actually, it could be erroneously determined that knocking has occurred. Accordingly, a technique has been proposed that determines whether knocking has occurred or not based on the waveform of vibration for considering such characteristics other than the magnitude as the crank angle at which vibration occurs and the damping rate.

A knock control device for an internal combustion engine disclosed in Japanese Patent Laying-Open No. 2003-021032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor; and a final knock determination portion finally determining occurrence of knocking based on the knock temporal determination of the first temporal determination portion and the knock temporal determination of the second temporal determination portion. When both of the first and second temporal determination portions determine that knocking has occurred, the final knock determination portion finally determines that knocking has occurred. The first temporal determination portion makes a comparison between the maximum value of the output signal detected by the knock sensor and a knock determination level (knock determination value) calculated based on the result of processing by the statistical processing portion to determine whether or not knocking has occurred. The knock determination value is corrected, based on the frequency of occurrence of knocking, to a value determined by subtracting a set value $\Delta V$ from the knock determination value or to a value determined by adding to the knock determination value the product of a value A larger than "1" and set value $\Delta V$.

When the knock determination value is corrected, it is not preferable that the knock determination value is corrected without limitation. This is for the reason that the magnitude of vibration occurring in the internal combustion engine varies depending on the condition of the engine itself and the drive environment and thus the corrected knock determination value is not necessarily appropriate all the time. Therefore, if an extreme correction is made, the knock determination value is too large or too small with respect to the magnitude of vibration occurring in the internal combustion engine, resulting in deterioration of the precision with which the determination is made as to whether or not knocking has occurred, contrary to the intention. Japanese Patent Laying-Open No. 2003-021032, however, is silent about restricting the knock determination value.

SUMMARY OF THE INVENTION

An object of the present invention is to provide a device and the like for determining knocking of an internal combustion engine while capable of suppressing deterioration of the precision with which whether knocking has occurred or not is determined.

According to an aspect of the present invention, a device for determining knocking of an internal combustion engine includes a knock sensor detecting a magnitude of vibration of the internal combustion engine, and an operation unit. The operation unit calculates a first value according to the magnitude of vibration of the internal combustion engine, determines whether or not knocking has occurred in the internal combustion engine based on a result of comparison between the first value and a predetermined second value, corrects the second value based on magnitudes detected in a plurality of ignition cycles, sets at least one of an upper limit and a lower limit of the second value based on the magnitudes detected in the plurality of ignition cycles, and restricts the second value so that the second value is within at least one of the upper limit and the lower limit as set.

Regarding the configuration as described above, the first value according to the magnitude of vibration of the internal combustion engine is calculated. Based on the result of comparison between the first value and a predetermined second value, whether or not knocking has occurred in the internal combustion engine is determined. The second value to be compared with the first value for determining whether or not knocking has occurred is corrected based on the magnitudes detected in a plurality of ignition cycles. Further, based on the magnitudes detected in the ignition cycles, at least one of an upper limit and a lower limit of the second value is set. The second value is restricted so that the second value is within at least one of the upper limit and the lower limit. Thus, in a range of magnitude of vibration that actually occurs in the internal combustion engine, the second value can be corrected that is used as a reference value for determining whether or not knocking has occurred. Therefore, it can be suppressed that the second value is too small or too large with respect to the magnitude of vibration occurring in the internal combustion engine. Accordingly, the device for determining knocking of the internal combustion engine can be provided that can suppress deterioration in precision of the determination as to whether or not knocking has occurred.

Preferably, the operation unit sets at least one of the upper limit and the lower limit of the second value based on a standard deviation of the magnitudes.

Regarding the configuration as described above, at least one of the upper limit and the lower limit of the second value is set based on the standard deviation of the magnitudes. Thus, the upper limit or lower limit can be obtained according to the magnitude of vibration that actually occurs in the internal combustion engine.

Still preferably, the operation unit sets at least one of the upper limit and the lower limit of the second value to a product of the standard deviation and a predetermined factor.

Regarding the configuration as described above, the upper limit or lower limit can be obtained by multiplying the standard deviation by a predetermined factor.

Still preferably, the operation unit restricts the second value so that the second value is within at least one of the upper limit and the lower limit as set and within at least one of a predetermined constant upper limit and a predetermined constant lower limit.

Regarding the configuration as described above, the second value is restricted so that the second value is within at least one of the upper limit and the lower limit that are set based on the magnitudes detected in a plurality of ignition cycles and so that the second value is within at least one of a predetermined constant upper limit and a predetermined constant lower limit. Thus, even if the magnitude of vibration is not correctly detected and the upper limit or lower limit determined based on the magnitude of vibration is an inappropriate value, deterioration in precision of the determination as to whether or not knocking has occurred can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a map of a determination value V(KX) stored in the ROM of the engine ECU.

FIG. 8 shows a frequency distribution of a magnitude value LOG(V).

DESCRIPTION OF THE PREFERRED EMBODIMENTS

Figure 1:
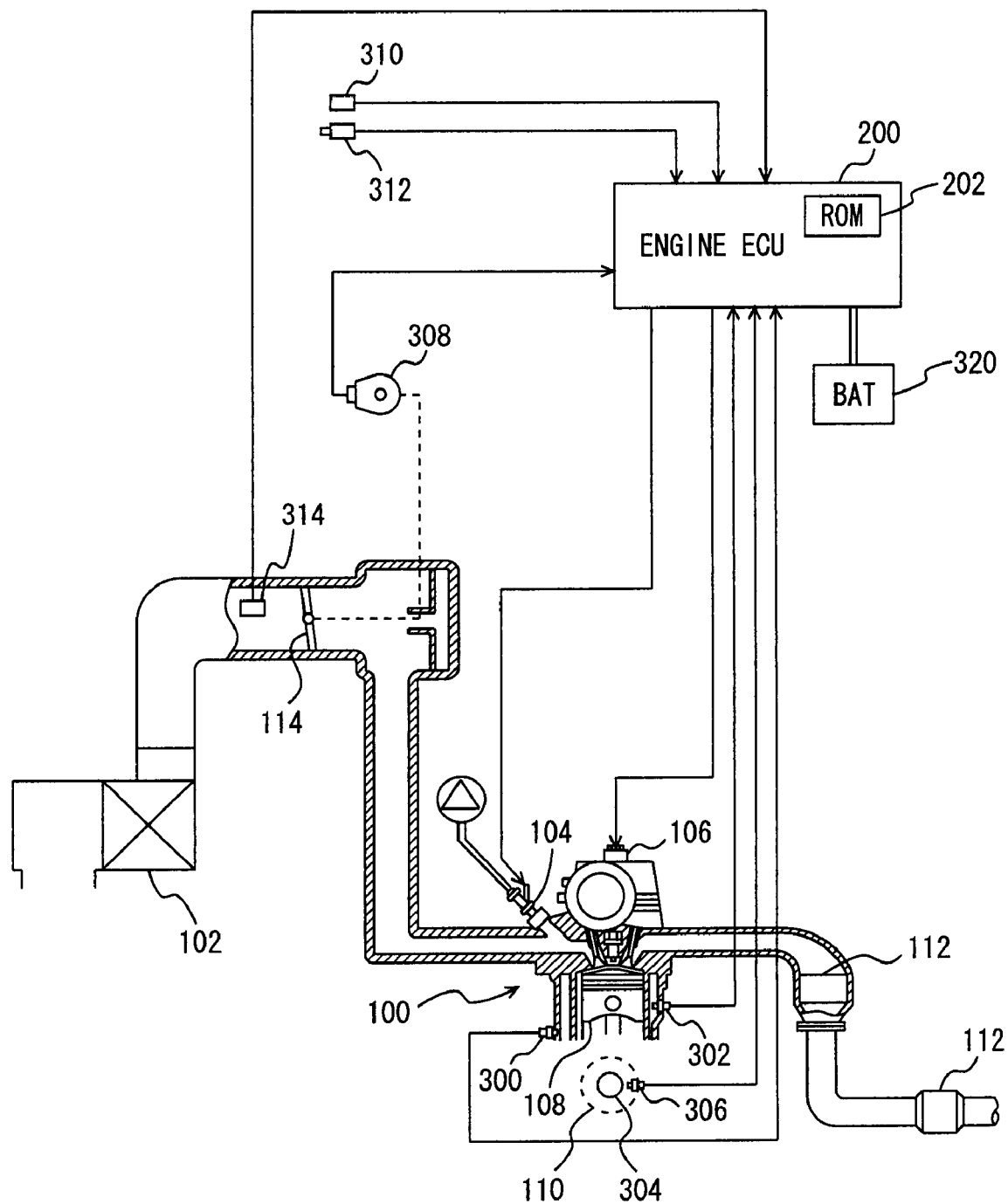
FIG. 1 is a schematic configuration diagram showing an engine controlled by an engine ECU that is a knocking determination device according to an embodiment of the present invention.

In the following, embodiments of the present invention will be described with reference to the drawings. In the following description, like components are denoted by like reference characters. They are named and function identically as well. Therefore, a detailed description thereof will not be repeated.

With reference to FIG. 1, an engine 100 of a vehicle mounted with a knocking determination device according to the present embodiment of the invention will be described. Engine 100 is provided with a plurality of cylinders. The knocking determination device according to the embodiment is accomplished by a program executed by an engine ECU (Electronic Control Unit) 200 for example.

Engine 100 is an internal combustion engine in which an air-fuel mixture of air drawn in from an air cleaner 102 and fuel injected from an injector 104 is ignited by a spark plug 106 and burnt in a combustion chamber. While the ignition timing is controlled to be MBT (Minimum advance for Best Torque) at which output torque becomes the maximum, the ignition timing is retarded or advanced according to an operation state of engine 100, for example, when knocking occurs.

When the air-fuel mixture is burnt, a piston 108 is pushed down by the combustion pressure and a crankshaft 110 is rotated. The air-fuel mixture after combustion (exhaust gas) is cleaned by three-way catalysts 112 and exhausted to the outside of the vehicle. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 for an opening position of the throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates a voltage in response to vibration of engine 100. The magnitude of the voltage corresponds to the magnitude of vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, magnetic flux passing through a coil portion of crank position sensor 306 increases/decreases to generate electromotive force in the coil portion. Crank position sensor 306 sends a signal representing the electromotive force to engine ECU 200. Engine ECU 200 detects the crank angle and the number of rotations of crankshaft 110 based on the signal sent from crank position sensor 306.

Sensor 308 for the opening position of the throttle detects an opening position of the throttle and sends a signal representing the detection result to engine ECU 200. Vehicle speed sensor 310 detects the number of rotations of a wheel (not shown) and sends a signal representing the detection result to engine ECU 200. Engine ECU 200 calculates the vehicle speed based on the number of rotations of the wheel. Ignition switch 312 is turned on by a driver when engine 100 is to be started. Air flow meter 314 detects the amount of intake air into engine 100 and sends a signal representing the detection result to engine ECU 200.

Engine ECU 200 is operated by electric power supplied from an auxiliary battery 320 that is a power supply. Engine ECU 200 performs computation based on signals sent from respective sensors and ignition switch 312 and a map and a program stored in a ROM (Read-Only Memory) 202, and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle, and determines whether or not knocking has occurred in engine 100 based on the detected vibration waveform. The knock detection gate in the embodiment is the portion from the top dead center (0°) to 90° in a combustion stroke. The knock detection gate is not limited to this.

Figure 2:
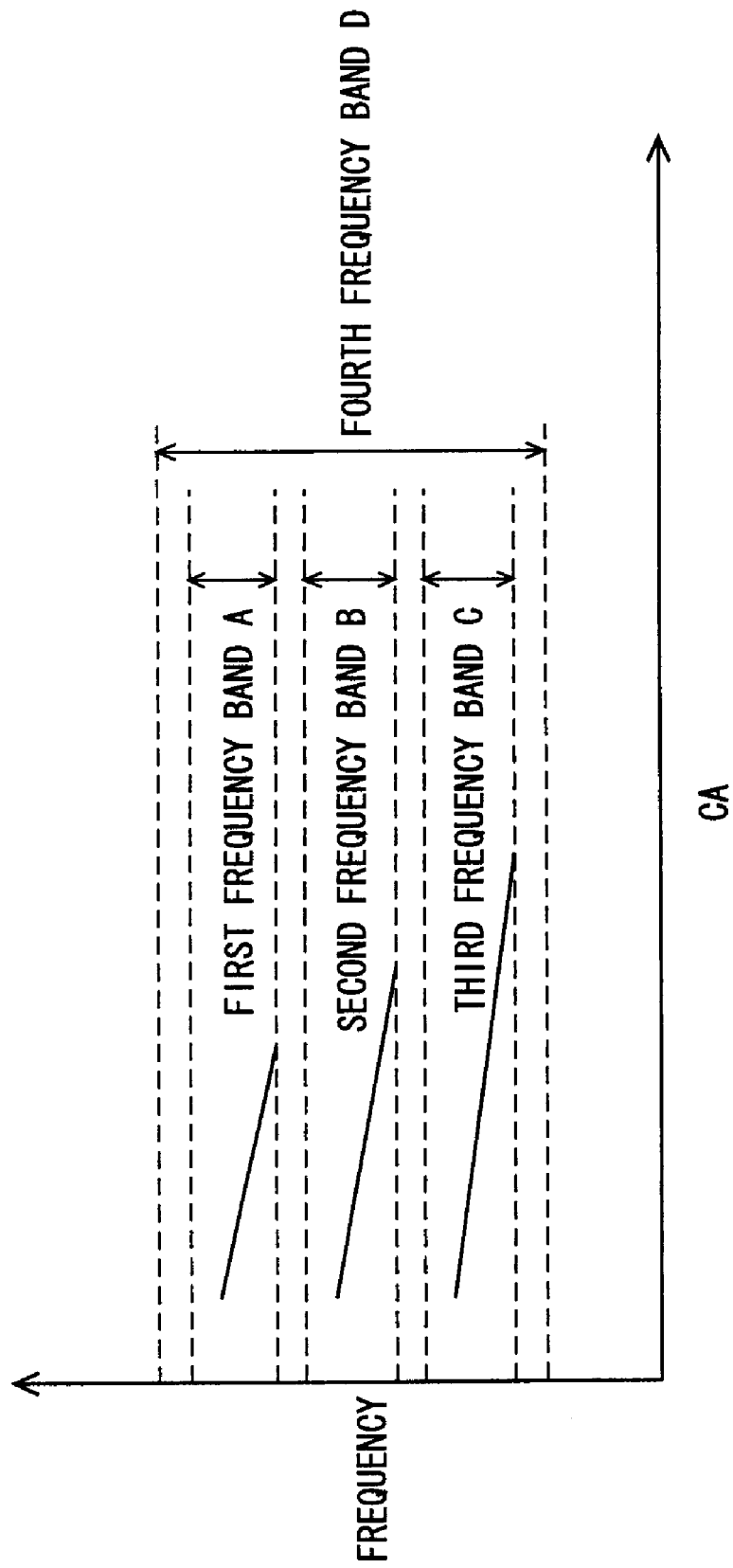
FIG. 2 shows a frequency band of vibration generated in the engine when knocking occurs.

When knocking occurs, vibration at a frequency near the frequency shown by a solid line in FIG. 2 is generated in engine 100. The frequency of the vibration generated due to the knocking is not constant and varies in a certain range of frequency. Therefore, in the embodiment, as shown in FIG. 2, the vibration in a fourth vibration band D including a first frequency band A, a second frequency band B and a third frequency band C is detected. In FIG. 2, CA represents the crank angle. The number of frequency bands of vibration generated due to the knocking is not restricted to three.

Figure 3:
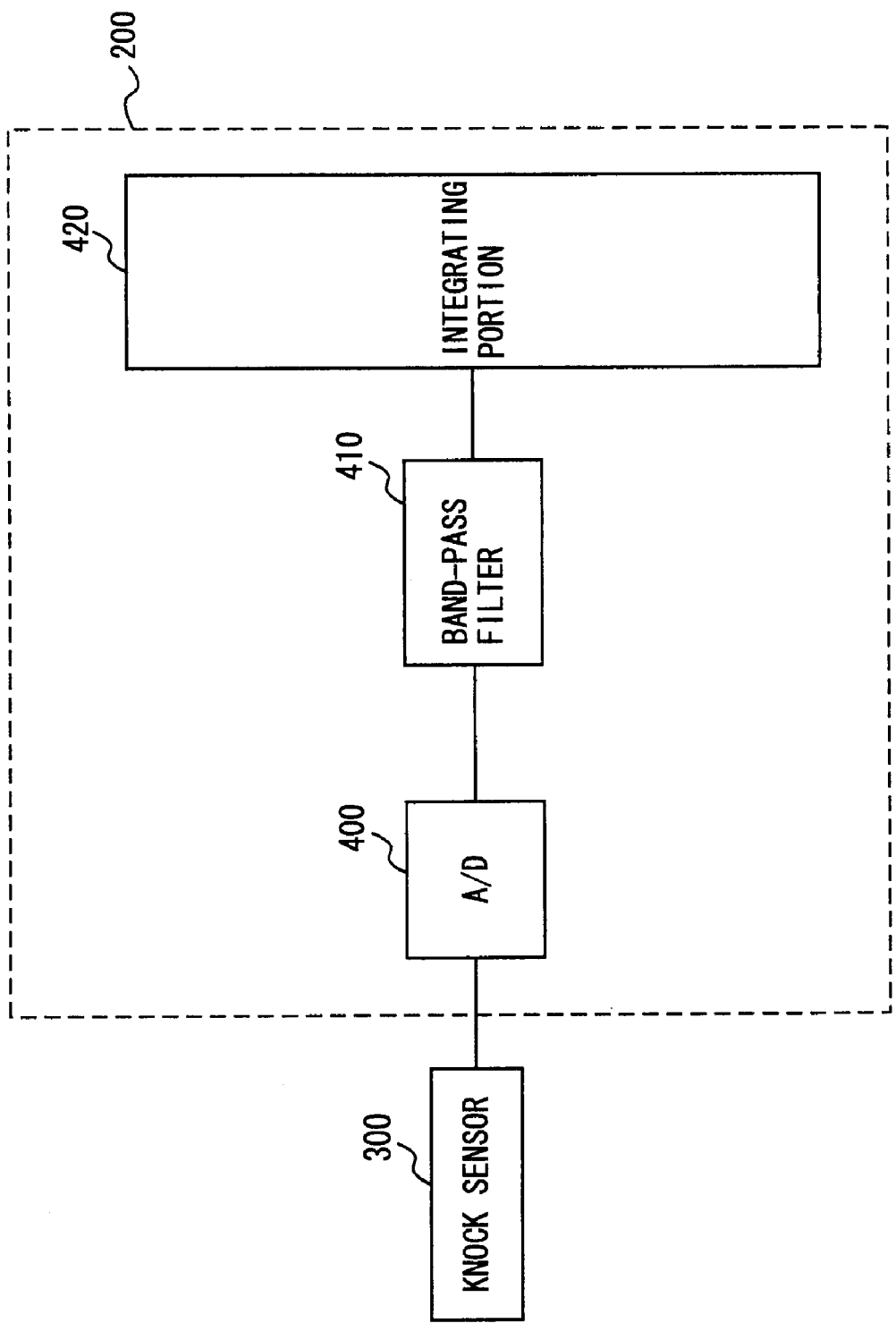
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter 410 and an integrating portion 420.

A/D converter 400 converts an analog signal sent from knock sensor 300 into a digital signal. Band-pass filter 410 allows passage of only signals in the fourth frequency band D out of signals sent from knock sensor 300. In other words, band-pass filter 410 extracts only the vibration in the fourth frequency band D from the vibration detected by knock sensor 300.

Figure 4:
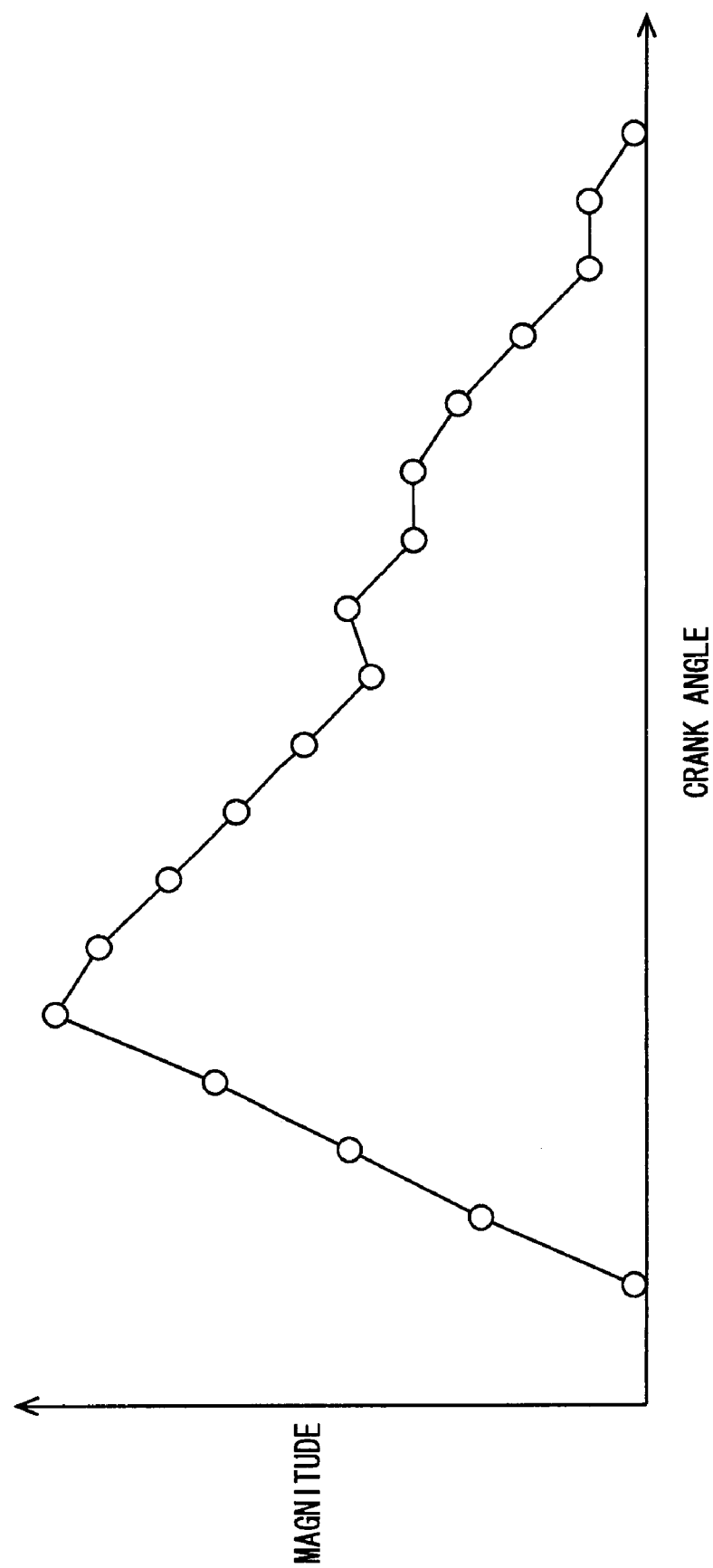
FIG. 4 shows a vibration waveform of the engine.

Integrating portion 420 integrates signals selected by band-pass filter 410, i.e., magnitudes of vibration for a crank angle of 5° at a time. The resultant value determined by the integration is hereafter referred to as integrated value. By calculating the integrated value in association with the crank angle, the vibration waveform of engine 100 is detected as shown in FIG. 4.

Figure 5:
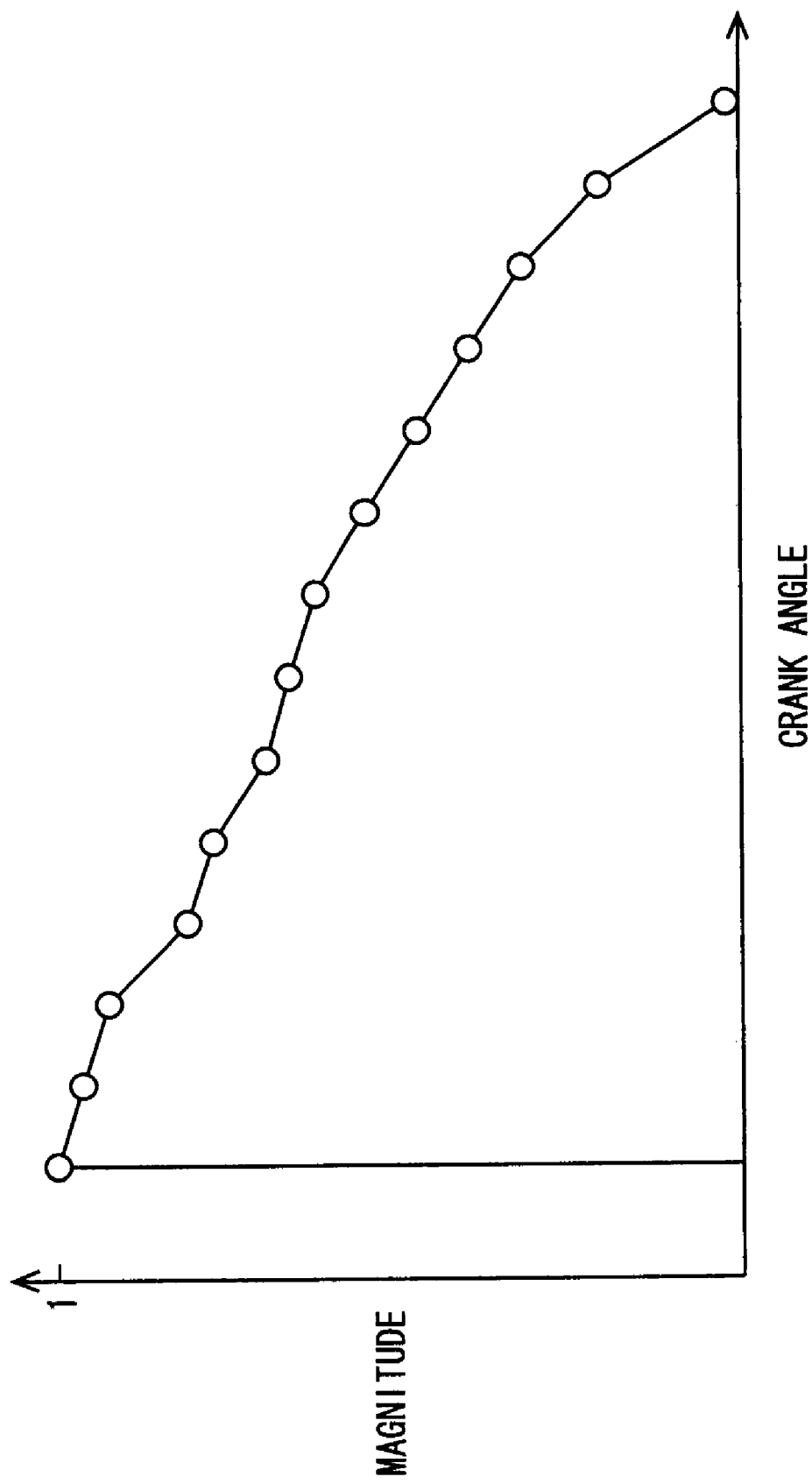
FIG. 5 shows a knock waveform model stored in a ROM of the engine ECU.

The detected vibration waveform is compared with a knock waveform model stored in ROM 202 of engine ECU 200 as shown in FIG. 5. The knock waveform model is formed in advance as a model of the vibration waveform when the knocking occurs in engine 100.

In the knock waveform model, the magnitudes of vibration are expressed as dimensionless numbers in a range of 0 to 1 and the magnitude of vibration is not uniquely associated with the crank angle. In other words, for the knock waveform model of the embodiment, while the magnitude of vibration is defined as the one that decreases as the crank angle increases after a peak value of the magnitude of vibration, a crank angle at which the magnitude of vibration has the peak value is not defined.

The knock waveform model in the embodiment corresponds to the vibration in a predetermined range of crank angle and after the peak value of the magnitude of vibration generated due to knocking. A knock waveform model may be stored that corresponds to the vibration after a rising edge of vibration caused by knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in the case where the knocking is forcibly generated in the median characteristic engine. The method of forming the knock waveform model is not limited to this, and the model may alternatively be formed by simulation.

Figure 6:
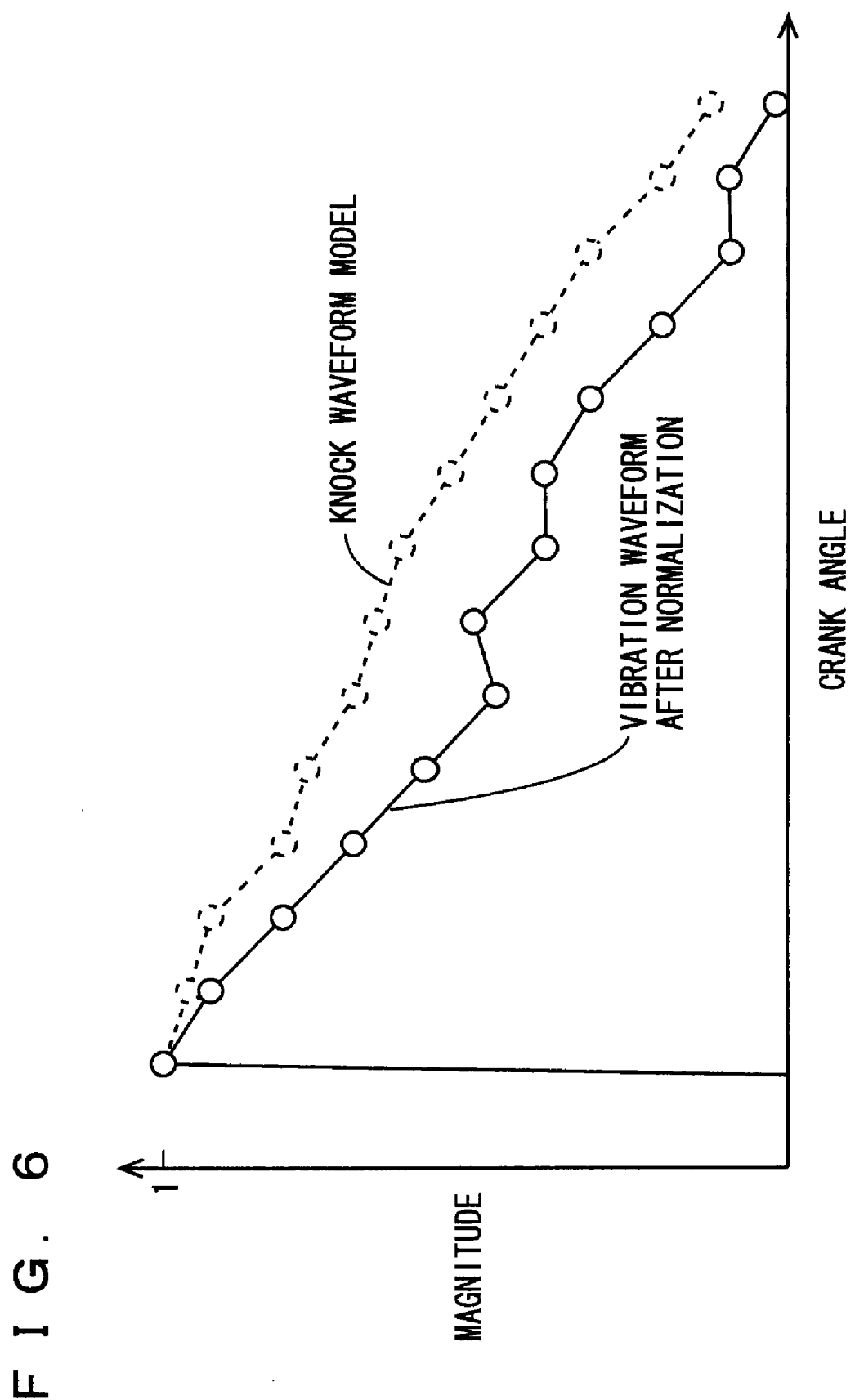
FIG. 6 shows a vibration waveform and a knock waveform model as compared with each other.

In comparison between the detected waveform and the knock waveform model, as shown in FIG. 6, a normalized waveform and the knock waveform model are compared with each other. Here, normalization means to express the magnitude of vibration as a dimensionless number in a range of 0 to 1 by dividing each integrated value by a maximum value of the integrated value in the detected vibration waveform, for example. However, the method of normalization is not limited to this.

In the embodiment, engine ECU 200 calculates a correlation coefficient K which represents the degree of similarity of the normalized vibration waveform to the knock waveform model (represents a deviation of the vibration waveform and the knock waveform model from each other). In the state where the timing at which the magnitude of vibration becomes a maximum value in the normalized vibration waveform is synchronized with the timing at which the magnitude of vibration becomes a maximum value in the knock waveform model, the absolute value of the difference (deviation amount) between the magnitude in the normalized vibration waveform and the magnitude in the knock waveform model is calculated for each crank angle (every 5° of the crank angle) to thereby calculate correlation coefficient K. The absolute value of the difference between the magnitude in the vibration waveform and the magnitude in the knock waveform model may alternatively be calculated for every crank angle other than 5°.

Supposing that the absolute value of the deviation of the normalized vibration waveform and the knock waveform model from each other for each crank angle is $\Delta S(I)$ (I is a natural number) and a value obtained by integrating the magnitude of vibration in the knock waveform model by the crank angle (an area of the knock waveform model) is S, correlation coefficient K is calculated by the equation: $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the larger the calculated correlation coefficient K is. Therefore, if a waveform of vibration caused by factors other than the knocking is included in the vibration waveform, the value of calculated correlation coefficient K is small. The method of calculating correlation coefficient K is not limited to this.

Furthermore, engine ECU 200 calculates a knock magnitude N based on the maximum value (peak value) of the integrated values. Supposing that the maximum integrated value is P and a value representing the magnitude of vibration of engine 100 where knocking does not occur is BGL (Back Ground Level), knock magnitude N is calculated by the equation: N=P/BGL. It is noted that maximum integrated value P used in calculating knock magnitude N is logarithmically converted. The method of calculating knock magnitude N is not limited to this.

BGL is calculated as a value obtained by subtracting the product of a standard deviation $\sigma$ and a coefficient (for example "1") from a median value V(50) in the frequency distribution of magnitude values LOG(V), which will be described later. The method of calculating BGL is not limited to this, and BGL may be stored in ROM 202 in advance.

In the embodiment, engine ECU 200 compares calculated knock magnitude N and a determination value V(KX) with each other, and further compares the detected waveform and the stored knock waveform model with each other. Then, engine ECU 200 determines whether or not knocking has occurred in engine 100 for every ignition cycle (from 0° to 720° of the crank angle).

As shown in FIG. 7, determination values V(KX) are stored as a map for respective ranges divided according to an operation state represented by the parameters that are engine speed NE and intake air amount KL. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to this. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, because of variation in the output values and degradation of knock sensor 300, the same vibrations occurring in engine 100 could be detected as vibrations of respective magnitudes different from each other. In this case, it is necessary to correct determination value V(KX) and to determine whether or not knocking has occurred by using determination value V(KX) appropriate for the magnitude detected actually.

Therefore, in the embodiment as shown in FIG. 8, the frequency of occurrence of knocking is determined based on the frequency distribution representing a relationship between a magnitude value LOG(V) which is a value obtained by logarithmically converting magnitude V and a frequency (the number of times, a probability) of detection of each magnitude value LOG(V), and corrects determination value V(KX) according to the frequency of occurrence of knocking.

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG(V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the contrary, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the contrary, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. The method of calculating median value V(50) and standard deviation σ is not limited to this. Also, initial values of median value V(50) and standard deviation σ may be values set in advance or may be "0".

Using median value V(50) and standard deviation σ, a knock determination level V(KD) is calculated. As shown in FIG. 8, a value obtained by adding the product of a coefficient U(1) (U(1) is a constant and U(1)=3, for example) and standard deviation σ to median value V(50) is a knock determination level V(KD). The method of calculating knock determination level V(KD) is not limited to this.

Proportion (frequency) of magnitude values LOG(V) greater than knock determination level V(KD) is determined as a frequency of occurrence of knocking, and counted as knock proportion KC. If knock proportion KC is greater than a threshold value KC(0), then determination value V(KX) is corrected to be decreased by a predetermined correction amount so that the frequency of retarding the ignition timing becomes higher. If knock proportion KC is smaller than threshold value KC(0), then determination value V(KX) is corrected to be increased by a predetermined correction amount so that the frequency of advancing ignition timing becomes higher.

Coefficient U is a coefficient obtained based on data and findings obtained by experiments and the like. Magnitude value LOG(V) greater than knock determination level V(KD) when U=3 substantially agrees with magnitude value LOG(V) in an ignition cycle in which knocking has actually occurred. Any value other than "3" may be used as coefficient U.

Figure 9:
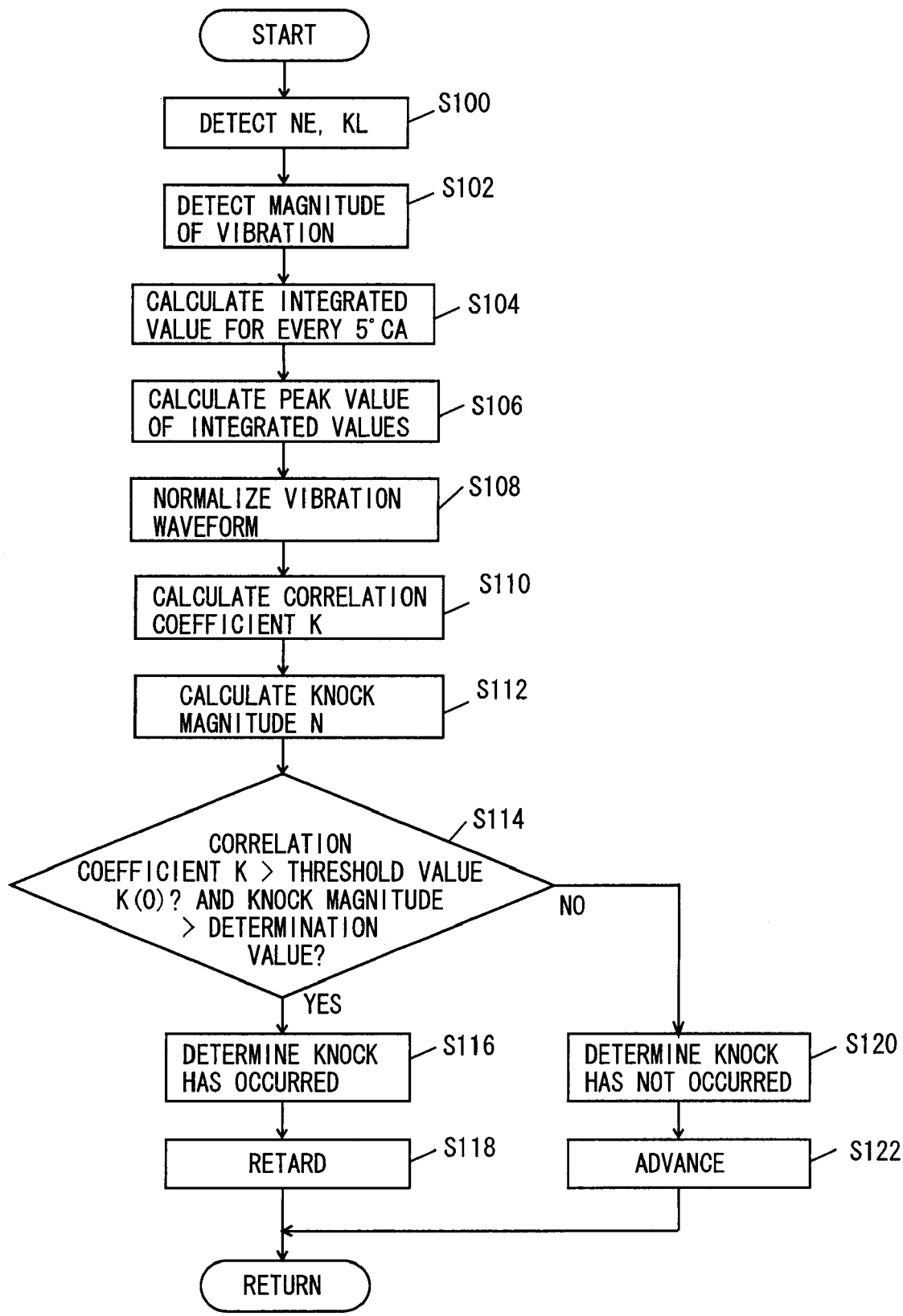
FIGS. 9 to 12 are (first to fourth) flowcharts showing a control structure of a program executed by the engine ECU that is the knocking determination device according to the embodiment of the present invention.

With reference to FIG. 9, a description will be given of a control structure of a program executed by engine ECU 200 which is the knocking determination device according to the embodiment so as to control the ignition timing by determining whether or not knocking has occurred in each ignition cycle.

In step 100 (hereafter "step" will be abbreviated as "S"), engine ECU 200 detects engine speed NE based on a signal sent from crank position sensor 306 and detects intake air amount KL based on a signal sent from air flow meter 314.

In S102, engine ECU 200 detects the magnitude of vibration of engine 100 based on a signal sent from knock sensor 300. The magnitude of vibration is expressed as an output voltage of knock sensor 300. The magnitude of vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibration) of knock sensor 300 for every 5° (for 5°) of crank angle. The integrated value is calculated to thereby detect a vibration waveform of engine 100.

In S106, engine ECU 200 calculates the largest integrated value (peak value P) among integrated values of the vibration waveform of engine 100.

In S108, engine ECU 200 normalizes the vibration waveform of engine 100. Here, normalization means to express the magnitude of vibration as a dimensionless number in a range of 0 to 1 by dividing each integrated value by the calculated peak value P.

In S110, engine ECU 200 calculates correlation coefficient K. In S112, engine ECU 200 calculates knock magnitude N.

In S114, engine ECU 200 determines whether correlation coefficient K is greater than threshold value K(0) and knock magnitude N is greater than determination value V(KX). If correlation coefficient K is greater than threshold value K(0) and knock magnitude N is greater than determination value V(KX) (YES in S114), the process proceeds to S116. Otherwise (NO in S114), the process proceeds to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 10:
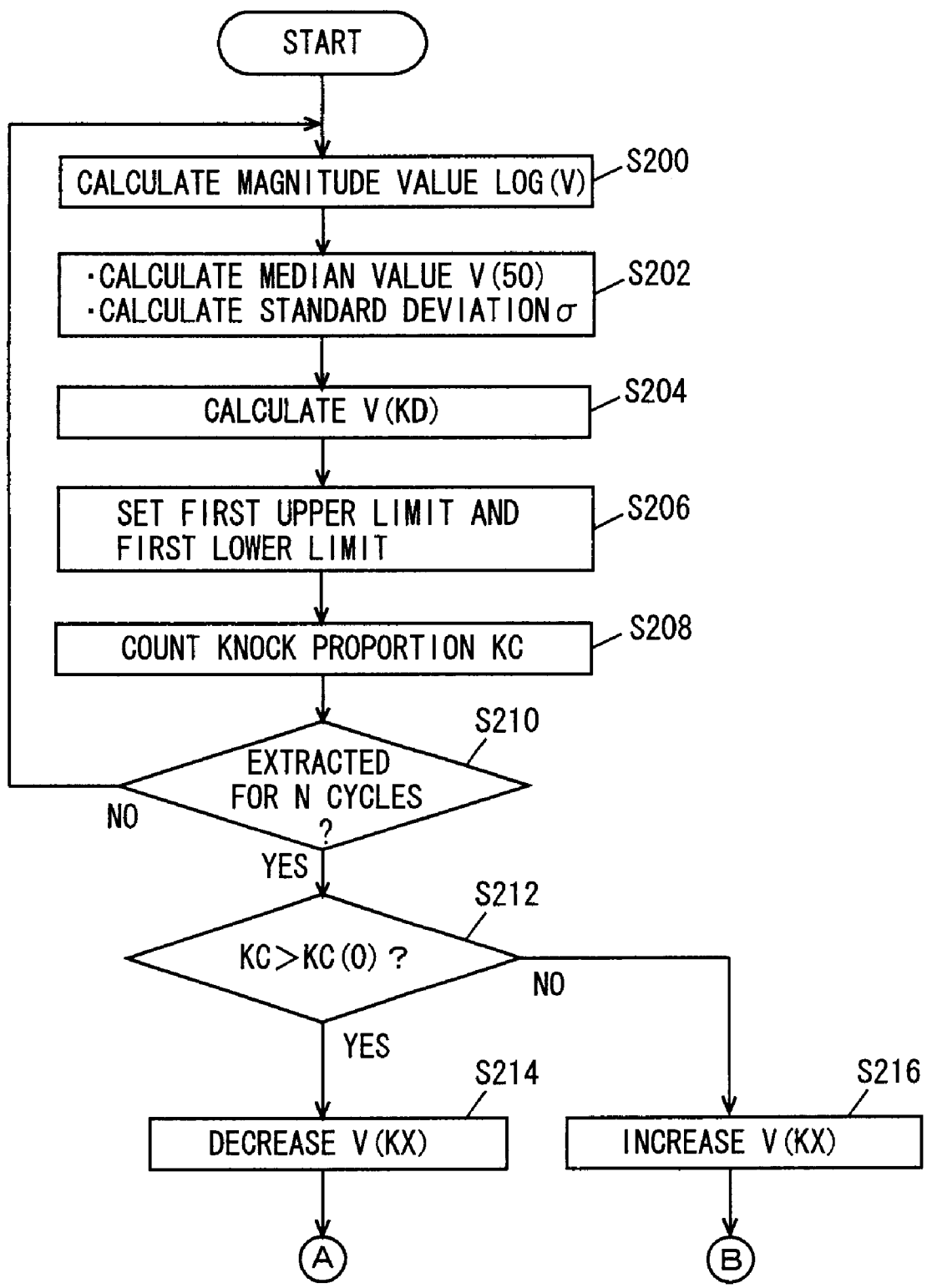
Figure 11:
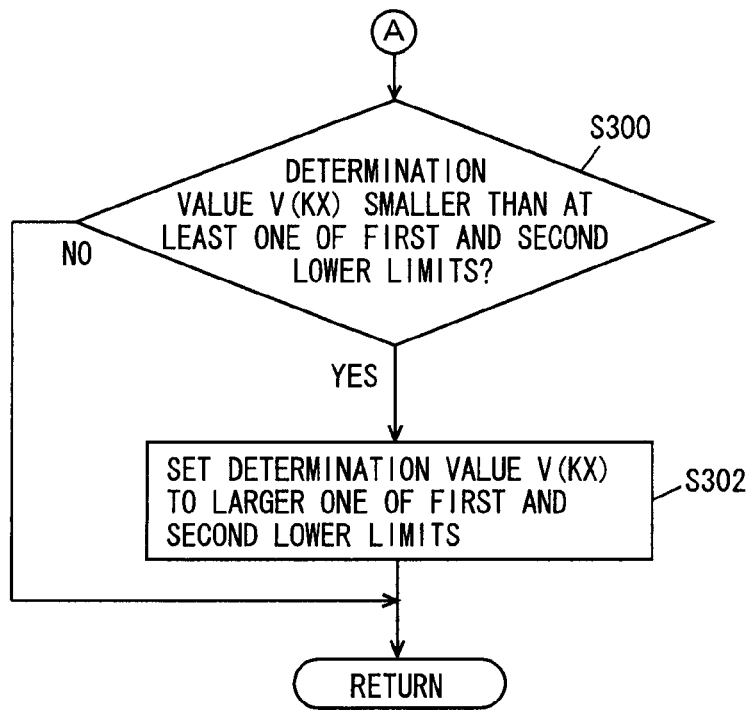
Figure 12:
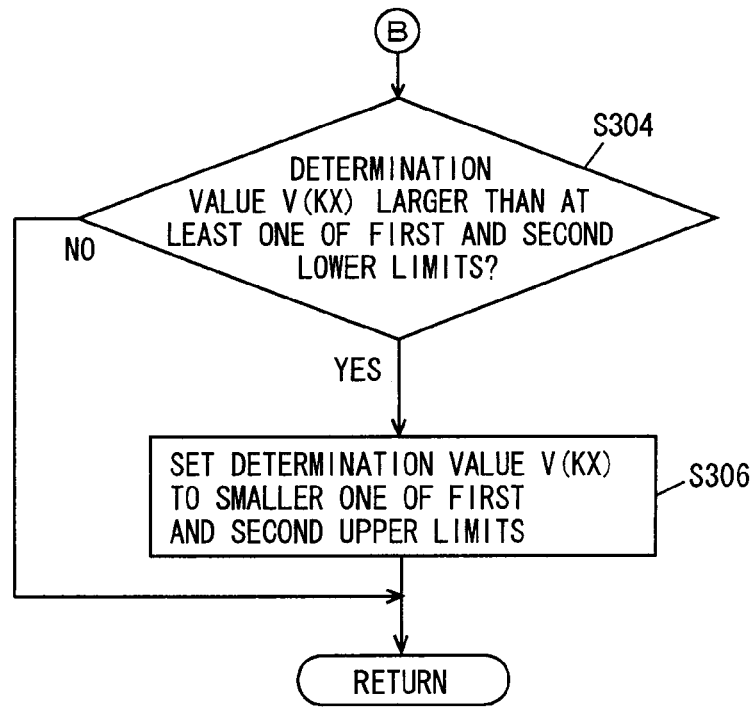

Referring to FIGS. 10 to 12, a description will be given of a control structure of a program executed by engine ECU 200, which is the knocking determination device of the present invention, for correcting determination value V(KX) for every predetermined number of ignition cycles.

In S200, engine ECU 200 calculates magnitude value LOG (V) from magnitude V detected based on a signal sent from knock sensor 300. Here, magnitude V refers to a peak value of the magnitudes for a predetermined range of crank angle (peak value of the integrated values for every 5°).

In S202, engine ECU 200 calculates median value V(50) and standard deviation σ of magnitude value LOG(V). Median value V(50) and standard σ may be calculated each time magnitude values LOG(V) in N ignition cycles (N is a natural number, for example, N=200) are extracted.

In S204, engine ECU 200 calculates knock determination level V(KD) based on median value V(50) and standard σ.

In S206, engine ECU 200 sets a first upper limit of determination value V(KX) to the product of standard σ and a factor A (A=5 for example) and sets a first lower limit of determination value V(KX) to the product of standard σ and a factor B (B<A, B=2 for example). One of the first upper limit and the first lower limit may be set.

In S208, engine ECU 200 counts magnitude values LOG (V) larger than knock determination level V(KD) to determine the ratio or proportion of the counted magnitude values to the whole magnitude values and provide the determined ratio as knock proportion KC.

In S210, engine ECU 200 determines whether or not magnitude values LOG(V) in N cycles have been calculated since the latest correction of determination value V(KX). In the case where magnitude values LOG(V) in N cycles have been calculated (YES in S210), the process proceeds to S212. Otherwise (NO in S210), the process returns to S200.

In S212, engine ECU 200 determines whether or not knock proportion KC is larger than threshold value KC(0). In the case where knock proportion KC is larger than threshold value KC(0) (YES in S212), the process proceeds to S214. Otherwise (NO in S212), the process proceeds to S216.

In S214, engine ECU 200 decreases determination value V(KX) by a predetermined correction amount. In S216, engine ECU 200 increases determination value V(KX) by a predetermined correction amount.

In S300, engine ECU 200 determines whether or not determination value V(KX) as corrected is smaller than at least one of the first lower limit and a predetermined constant second lower limit.

In the case where determination value V(KX) is smaller than at least one of the first lower limit and the second lower limit (YES in S300), the process proceeds to S302. Otherwise (NO in S300), the process is ended.

In S302, engine ECU 200 sets determination value V(KX) to the larger one of the first lower limit and the second lower limit. In other words, determination value V(KX) is restricted so that the determination value is within (is not beyond) the first lower limit and the second lower limit.

In S304, engine ECU 200 determines whether or not determination value V(KX) as corrected is larger than at least one of the first upper limit and a predetermined constant second upper limit.

In the case where determination value V(KX) is larger than at least one of the first upper limit and the second upper limit (YES in S304), the process proceeds to S306. Otherwise (NO in S304), the process is ended.

In S306, engine ECU 200 sets determination value V(KX) to the smaller one of the first upper limit and the second upper limit. In other words, determination value V(KX) is restricted so that the determination value is within, namely is not beyond the first upper limit and the second upper limit.

A description will be given of an operation of engine ECU 200, which is the knocking determination device of the embodiment, based on the configuration and flowcharts as described above.

While engine 100 is operating, engine speed NE is detected based on the signal sent from crank position sensor 306 and intake air amount KL is detected based on the signal sent from air flow meter 314 (S100). Moreover, based on the signal sent from knock sensor 300, the magnitude of vibration of engine 100 is detected (S102).

Between the top dead center and 90° in the combustion stroke, the integrated value for every 5° is calculated (S104). In this way, the above-described vibration waveform of engine 100 as shown in FIG. 4 is detected.

As the integrated value for every 5° is used to detect the vibration waveform, the vibration waveform of which delicate variations are suppressed can be detected. Therefore, it is easy to compare the detected vibration waveform and the knock waveform model with each other.

Peak value P of the integrated values is calculated (S106). The integrated value in the vibration waveform of engine 100 is divided by the calculated peak value P to thereby normalize the vibration waveform (S108). By normalization, the magnitudes of vibration in the vibration waveform are expressed as dimensionless numbers in a range of 0 to 1. In this manner, the detected vibration waveform and the knock waveform model can be compared with each other irrespective of the magnitude of vibration. Therefore, it is unnecessary to store a large number of knock waveform models corresponding to the magnitudes of vibration to thereby facilitate forming of the knock waveform model.

The timing at which the magnitude of vibration is a maximum value in the vibration waveform after the normalization and the timing at which the magnitude of vibration is a maximum value in the knock waveform model are synchronized (see FIG. 6), and absolute value ΔS(I) of the deviation of the vibration waveform after the normalization and the knock waveform model from each other at each crank angle is calculated. Based on the total of calculated ΔS(I), i.e., ΣΔS(I) and value S obtained by integrating the magnitude of vibration in the knock waveform model by the crank angle, correlation coefficient K is calculated by K=(S−ΣΔS(I))/S (S110). In this manner, a degree of agreement between the detected vibration waveform and the knock waveform model is numerically represented to objectively determine the degree. Furthermore, by comparing the vibration waveform and the knock waveform model with each other, whether or not the vibration is a vibration at the time of knocking can be analyzed from behavior of the vibration such as an attenuating trend of the vibration.

Furthermore, knock magnitude N is calculated by dividing peak value P by BGL (S112). Thus, based on the magnitude of vibration, whether or not vibration of engine 100 is due to knocking can be analyzed in more detail.

If correlation coefficient K is greater than a predetermined value and knock magnitude N is greater than a predetermined determination value V(KX) (YES in S114), it is determined that knocking has occurred (S116) and the ignition timing is retarded (S118). As a result, occurrence of the knocking is suppressed. If correlation coefficient K is not greater than a predetermined value and knock magnitude N is not greater than a predetermined determination value (NO in S114), it is determined that knocking has not occurred (S122) and the ignition timing is advanced (S122). Thus, by comparing knock magnitude N and determination value V(KX) with each other, whether or not knocking has occurred is determined for each ignition cycle, and the ignition timing is retarded or advanced.

Due to variation of the output value and deterioration for example of knock sensor 300, the detected magnitude of vibration could be different even if the same vibration occurs in engine 100. In this case, it is necessary to correct determination value V(KX) and determine whether knocking has occurred or not using the determination value V(KX) appropriate for the actually detected magnitude.

Accordingly, in this embodiment, magnitude value LOG (V) is calculated (S200). Further, median value V(50) and standard σ of magnitude values LOG(V) are calculated (S202). Based on these median value V(50) and standard deviation σ, knock determination level V(KD) is calculated (S204).

At this time, the first upper limit of determination value V(KX) is set to the product of standard σ and factor A, and the first lower limit of determination value V(KX) is set to the product of standard σ and factor B (S206).

Magnitude values LOG(V) larger than knock determination level V(KD) are counted to determine the ratio or proportion of the counted values to the whole magnitude values and thereby provide the ratio as knock proportion KC (S208).

When magnitude values LOG(V) for N cycles have been calculated since the latest correction of determination value V(KX) (YES in S210) and in the case where knock proportion KC is larger than threshold value KC(0) (YES in S212), determination value V(KX) is decreased so that the frequency at which the ignition timing is controlled to be retarded (S118) is higher (S214). In the case where knock proportion KC is smaller than threshold value KC(0) (NO in S212), determination value V(KX) is increased so that the frequency at which the ignition timing is controlled to be advanced (S122) is higher (S216). In this way, determination value V(KX) used for determining knocking for one ignition cycle can be appropriately corrected and the ignition timing can be appropriately controlled.

When determination value V(KX) is corrected to be smaller, if determination value V(KX) after corrected is smaller than at least one of the first lower limit and a predetermined constant second lower limit (YES in S300), determination value V(KX) is set to the larger one of the first lower limit and the second lower limit (S302).

Similarly, when determination value V(KX) is corrected to be larger, if determination value V(KX) is larger than at least one of the first upper limit and a predetermined constant second upper limit (YES in S304), determination value V(KX) is set to the smaller one of the first upper limit and the second upper limit (S306). In this way, it can be suppressed that determination value V(KX) is too small or too large.

As heretofore described, the engine ECU, which is the knocking determination device of the embodiment, determines whether or not knocking has occurred based on the determination as to whether or not knock magnitude N calculated from the magnitude of vibration occurring in the engine is larger than determination value V(KX). Determination value V(KX) is corrected based on the frequency distribution of magnitude values LOG(V) that are determined by logarithmically converting magnitudes V. Further, the first upper limit of determination value V(KX) is set to the product of standard σ calculated from the frequency distribution and factor A. The first lower limit of determination value V(KX) is set to the product of standard σ and factor B. In this way, the upper limit and the lower limit appropriate for the magnitude of vibration actually occurring in the engine can be obtained. Within the range defined by the upper limit and the lower limit, determination value V(KX) is corrected. Therefore, it can be suppressed that determination value V(KX) is too large or too small with respect to the magnitude of vibration occurring in the engine. Consequently, deterioration can be suppressed of the precision of determination as to whether or not knocking has occurred.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for determining knocking of an internal combustion engine, comprising:

a knock sensor detecting a magnitude of vibration of said internal combustion engine; and an operation unit, wherein said operation unit calculates a first value according to the magnitude of vibration of said internal combustion engine, said operation unit determines whether or not knocking has occurred in said internal combustion engine based on a result of comparison between said first value and a predetermined second value, said operation unit corrects said second value based on magnitudes detected in a plurality of ignition cycles, said operation unit sets at least one of an upper limit and a lower limit of said second value based on said magnitudes detected in said plurality of ignition cycles, and said operation unit restricts said second value so that said second value is within at least one of said upper limit and said lower limit as set.

2. The device according to claim 1, wherein said operation unit sets at least one of the upper limit and the lower limit of said second value based on a standard deviation of said magnitudes.

3. The device according to claim 2, wherein said operation unit sets at least one of the upper limit and the lower limit of said second value to a product of said standard deviation and a predetermined factor.

4. The device according to claim 1, wherein said operation unit restricts said second value so that said second value is within at least one of the upper limit and the lower limit as set and within at least one of a predetermined constant upper limit and a predetermined constant lower limit.

5. A method of determining knocking of an internal combustion engine, comprising the steps of:
- detecting a magnitude of vibration of said internal combustion engine;
- calculating a first value according to the magnitude of vibration of said internal combustion engine;
- determining whether or not knocking has occurred in said internal combustion engine based on a result of comparison between said first value and a predetermined second value;
- correcting said second value based on magnitudes detected in a plurality of ignition cycles;
- setting at least one of an upper limit and a lower limit of said second value based on said magnitudes detected in said plurality of ignition cycles; and
- restricting said second value so that said second value is within at least one of said upper limit and said lower limit.

6. The method according to claim 5, wherein
said step of setting at least one of the upper limit and the lower limit of said second value includes the step of setting at least one of the upper limit and the lower limit of said second valued based on a standard deviation of said magnitudes.

7. The method according to claim 6, wherein
said step of setting at least one of the upper limit and the lower limit of said second value includes the step of setting at least one of the upper limit and the lower limit of said second value to a product of said standard deviation and a predetermined factor.

8. The method according to claim 5, wherein
said step of restricting said second value includes the step of restricting said second value so that said second value is within at least one of the upper limit and the lower limit set in said step of setting and within at least one of a predetermined constant upper limit and a predetermined constant lower limit.

9. A device for determining knocking of an internal combustion engine, comprising:
- means for detecting a magnitude of vibration of said internal combustion engine;
- means for calculating a first value according to the magnitude of vibration of said internal combustion engine;
- means for determining whether or not knocking has occurred in said internal combustion engine based on a result of comparison between said first value and a predetermined second value;
- means for correcting said second value based on magnitudes detected in a plurality of ignition cycles;
- means for setting at least one of an upper limit and a lower limit of said second value based on said magnitudes detected in said plurality of ignition cycles; and
- means for restricting said second value so that said second value is within at least one of said upper limit and said lower limit set by said means for setting.

10. The device according to claim 9, wherein
said means for setting includes means for setting at least one of the upper limit and the lower limit of said second value based on a standard deviation of said magnitudes.

11. The device according to claim 10, wherein
said means for setting includes means for setting at least one of the upper limit and the lower limit of said second value to a product of said standard deviation and a predetermined factor.

12. The device according to claim 9, wherein
said means for restricting includes means for restricting said second value so that said second value is within at least one of the upper limit and the lower limit set by said means for setting and within at least one of a predetermined constant upper limit and a predetermined constant lower limit.

* * * * *